United States Patent
Mersmann et al.

(10) Patent No.: US 7,632,092 B2
(45) Date of Patent: Dec. 15, 2009

(54) REGULATING DEVICE FOR THE COOLING AIR FLOWS OF A BULK MATERIAL GRATE COOLER

(75) Inventors: Matthias Mersmann, Lichtenbusch (BE); Karl Schinke, Köln (DE); Thomas Binninger, Bonn (DE); Wilhelm Edel, Hennef (DE); Ralf Werker, Köln (DE)

(73) Assignee: KHD Humboldt Wedag GmbH, Köln (DE)

( * ) Notice: Subject to any disclaimer, the term of this patent is extended or adjusted under 35 U.S.C. 154(b) by 332 days.

(21) Appl. No.: 10/583,592

(22) PCT Filed: Dec. 16, 2004

(86) PCT No.: PCT/EP2004/014358

§ 371 (c)(1),
(2), (4) Date: Feb. 26, 2007

(87) PCT Pub. No.: WO2005/064256

PCT Pub. Date: Jul. 14, 2005

(65) Prior Publication Data

US 2008/0166675 A1    Jul. 10, 2008

(30) Foreign Application Priority Data

Dec. 19, 2003 (DE) ............... 103 59 801
Oct. 23, 2004 (DE) ............... 10 2004 051 699

(51) Int. Cl.
*F24H 7/08* (2006.01)
(52) U.S. Cl. ............. 432/77; 110/270; 110/281; 432/81; 198/750.2; 137/10
(58) Field of Classification Search ............ 432/61, 432/77, 81, 173, 233–235; 110/270, 281, 110/283; 137/10; 138/43, 46
See application file for complete search history.

(56) References Cited

U.S. PATENT DOCUMENTS

| 3,037,528 | A | | 6/1962 | Baars et al. |
| 3,540,484 | A | | 11/1970 | Brown et al. |
| 3,942,552 | A | * | 3/1976 | Logsdon ............ 137/517 |

(Continued)

FOREIGN PATENT DOCUMENTS

EP        0848646        6/1998

(Continued)

*Primary Examiner*—Gregory A Wilson
(74) *Attorney, Agent, or Firm*—Greer, Burns & Crain Ltd

(57) ABSTRACT

In order to provide an automatically operating cooling air regulating device for a grate cooler for cooling hot bulk material such as cement clinker, for example, which can be constructed easily and can be used without problems both for non-moving and also in particular for moving cooling grate regions or moving cooling grate systems, a regulating device with a regulator housing which is arranged below the cooling grate, performs its movements with it and is flowed through by the cooling air supplied is proposed according to the invention, an inner body which can be moved translatorily by the cooling air flow being guided displaceably in the regulator housing and the free flow cross section of the regulator housing remaining for the cooling air being reduced automatically with increasing height inside the regulator housing of the inner body against which the cooling air flows, and vice versa.

19 Claims, 3 Drawing Sheets

U.S. PATENT DOCUMENTS

| | | | | |
|---|---|---|---|---|
| 3,955,595 | A | * | 5/1976 | Modes ........................ 137/517 |
| 4,208,179 | A | * | 6/1980 | Gelsing et al. .............. 432/234 |
| 4,408,892 | A | * | 10/1983 | Combes et al. ............. 366/337 |
| 4,702,019 | A | * | 10/1987 | Tsuruno et al. ............... 34/168 |
| 5,184,641 | A | * | 2/1993 | Kuhn .......................... 137/504 |
| 5,584,686 | A | * | 12/1996 | Nielsen ........................ 432/77 |
| 7,484,957 | B2 | * | 2/2009 | Mersmann et al. ............ 432/77 |
| 2008/0173352 | A1 | * | 7/2008 | Schinke et al. ................ 137/10 |

FOREIGN PATENT DOCUMENTS

| | | |
|---|---|---|
| EP | 1021692 | 7/2000 |
| WO | WO 02/06748 | 1/2002 |

* cited by examiner

REGULATING DEVICE FOR THE COOLING AIR FLOWS OF A BULK MATERIAL GRATE COOLER

BACKGROUND OF THE INVENTION

The invention relates to a device for regulating the flow cross section in the cooling air inflows of a bulk material grate cooler for cooling hot bulk material such as cement clinker, for example, with a regulator housing which is integrated into the cooling air inflow below the cooling grate and in which a control element is moved in such a way that an increase in the flow rate in the region of the control element and, associated therewith, an incipient increase in the cooling air flow quantity bring about a reduction in the free flow cross section, and vice versa.

In a cement clinker production line, the hot cement clinker produced from calcined cement raw meal in a rotary tubular kiln is discharged from the kiln delivery end onto a cooler, as a rule onto the cooling grate of a grate cooler, is distributed thereon and is moved in the longitudinal direction toward the cooler delivery end by suitable conveying means, the cooling grate and the hot bulk material layer being passed through essentially from the bottom to the top by cooling air flows. The known grate cooler types are explained briefly below.

In a push grate cooler, stationary grate plate rows alternate with reciprocating grate plate rows seen in the conveying direction, all the grate plates are provided with cooling air openings and they are flowed through essentially from the bottom to the top by cooling air, and the combined oscillating movement of all the movable grate plate rows gradually transports the hot material to be cooled and in so doing cools it. As an alternative to such a push grate cooler, a grate cooler type in which the cooling grate flowed through by cooling air is not moved but is stationary is known from EP-B-1 021 692, for example. A number of rows of adjacent reciprocating beam-shaped pushing elements are arranged above the stationary grate surface and are moved between a forward stroke position in the direction of transport of the material being cooled and a return stroke position, so that the material is likewise moved successively, and in the process cooled, from the cooler start to the cooler end by the reciprocating movement of these pushing elements in the material bed to be cooled.

In such grate coolers, it is not always possible to avoid uneven distributions in the hot bulk material bed with regard to bulk material bed height, clinker grain size, temperature profile etc., which results in non-uniform cooling. This is because, in cooling grate regions with a greater bulk material bed height, the flow resistance for the cooling air increases, the flow rate falls and less cooling air is conducted through the bulk material bed, and conversely, in cooling grate regions with a small bulk material bed height, the flow resistance for the cooling air falls, its flow rate and the risk of an air breakthrough increase, and too great a cooling air quantity is conducted through precisely those bulk material bed regions which would require the smallest cooling air quantity.

It is therefore known in a grate cooler for cooling hot bulk material such as cement clinker (EP-B-0 848 646) to regulate the respective cooling air quantity in the cooling air inflows below the cooling grate automatically in each case in such a way that, when the cooling air flow quantity starts to increase, as a result of the bed height of material being cooled becoming smaller and the flow resistance decreasing, the clear cross-sectional area of the cooling air inflow lines concerned is reduced, and vice versa, so as in this way to compensate for a changing pressure drop over the bed of material being cooled, so that the cooling air quantity concerned is no longer dependent on the respective pressure loss or flow resistance of the cooling air in the zone concerned of the bed of material being cooled. In this connection, the known mechanical cooling air flow regulator operates with a weight-loaded swing flap with a horizontal pivoting axis, the swing flap automatically throttling the respective cooling air inflow to a greater or lesser extent according to the prevailing pressure conditions and flow conditions. If the known cooling air regulating device, which operates automatically with a pivoting lever weight actuated purely by gravity with a body acted on by the flow, were arranged below the cooling grate in the cooling air inflows of cooling grate zones which are not stationary but which, as in a push grate cooler, are reciprocated together with regulating devices for the purpose of bulk material transport, the automatic regulation of the regulating device would be disrupted by the reciprocating vibrating movement and the regulation result would thus be distorted.

A cooling air regulating device in a bulk material grate cooler is also known from WO 02/06748. In this device, a round stationary segment disk provided with through-openings is arranged in the cooling air supply line below the grate, and a vane disk mounted rotatably on a spindle is arranged above the segment disk, the vane disk rotating depending on the flow rate of the cooling air and in the process automatically varying the clear flow cross section of the segment disk in such a way that the vane disk is rotated counter to a spring force and the flow cross section is reduced when the flow rate increases, and vice versa. The risk that the functioning of the regulating device will be disrupted by the intermittent oscillating movement of the reciprocating cooling grate zones is not excluded in this automatically operating cooling air regulating device either.

SUMMARY OF THE INVENTION

The invention is based on the object of designing an automatically operating cooling air regulating device in such a way that it can be constructed easily and can be used without problems both for non-moving and also in particular for moving cooling grate regions or moving cooling grate systems of a grate cooler for cooling in particular hot cement clinker.

The regulating devices arranged in the cooling air inflows below the cooling grate of a bulk material cooler comprise in each case a regulator housing through which the cooling air supplied flows and also a control element which can be moved therein. It is characteristic of a regulating device according to the invention that, in the hollow-body-like regulator housing through which the cooling air flows essentially from the bottom to the top, an inner body serving as the control element, which can be moved translatorily by the cooling air flow, is guided displaceably and can be moved automatically by the cooling air flow. The inner body lying transversely to the main flow direction of the cooling air flow can be guided on a central spindle inside the regulator housing, for example. Displacement of the inner body causes the free flow cross section remaining for the cooling air flow to change in such a way that an increase in the flow rate of the cooling air in the region of the inner body and, associated therewith, an incipient increase in the cooling air flow quantity bring about a reduction in the flow cross section of the regulator housing, and vice versa. The translatory movement of the inner body in the regulator housing takes place counter to the action of a restoring force. For this purpose, at least one restoring spring, which can be supported by the spindle of the regulator housing and keeps the flow cross section of the regulator housing open in the absence of the cooling air flow, can advantageously act on the center of the inner body.

Gravity and moments of inertia, which could impair the functioning of the automatic regulation, are not a factor during operation of the automatically operating cooling air regulating device according to the invention. The cooling air regulating device according to the invention is therefore particularly suitable for use in bulk material coolers with moving cooling grate regions or moving cooling grate systems, that is therefore for the push grate coolers mentioned in the introduction and also for cooling grate systems which operate according to the walking floor conveying principle, which is explained in greater detail below.

Particularly advantageously, the regulating characteristic of the regulating device can be settable and variable by means of changing the preloading force of the at least one restoring spring, in particular in such a way, for example, that the restoring spring is a helical spring which is arranged around the regulator housing spindle and the end of which facing away from the control element disk is supported on a control element which is screwed adjustably onto the threaded end of the spindle for the purpose of setting/changing the spring preloading force. In this way, the regulating characteristic and also the desired value of the response of the regulating device according to the invention can be set and changed easily.

The regulating characteristic can represent the increase in the cooling air requirement with rising bed height of the material being cooled or increasing flow resistance of the bed of material being cooled for the cooling air. It can be used for regulating a volume flow of the cooling air which remains essentially constant irrespective of changes in the cooling air flow resistance.

The inner body serving as the control element inside the regulator housing can have the shape of, for example, a disk, a pot-shaped tube section etc. Instead of a helical spring, the restoring spring acting on the control element can also be another spring element which has a given preloading force. It would also be possible to dispense with a restoring spring completely and to adjust the weight of the inner body in such a way that the weight alone acts as the restoring force for the inner body.

Instead of on a central spindle, for example, the inner body can also be guided translatorily movably at its peripheral edge, so that in this case a guide spindle can be dispensed with.

According to one illustrative embodiment of the invention, the automatic regulation of the volume flow of the cooling air flowing through the cooling grate can be achieved by means of a regulating device with a cylindrical regulator housing, for example, which has a large number of openings distributed over the length or height and around the periphery, the cooling air flowing into the interior of the regulator housing through these openings and flowing out into the cooling grate on the upper side of the housing, which is flanged onto the lower side of the cooling grate. Should the pressure loss of the cooling air flowing out fall in the bulk material bed, more cooling air would tend to flow through the grate cooler. However, if the flow rate of the cooling air increases, the axially guided inner body, which for its part can have cooling air flowthrough openings, moves from the bottom toward the top by a certain amount, the number of openings flowed through by cooling air remaining in the regulator housing above the inner body and thus the quantity of the cooling air flowing into the regulator housing in this way being reduced. At the same time, the cooling air quantity flowing through the openings of the disk-shaped part of the inner body can increase, so that overall essentially automatic constant regulation of the volume flow of the cooling air is achieved.

Instead of the large number of cooling air passage openings distributed over the height and the periphery, the regulator housing can also have only at least one single opening extending helically from the bottom to the top, for example, so that in this case as well displacement of the inner body upward reduces the cooling air volume flow, and vice versa.

According to a further illustrative embodiment of the invention, the automatic regulation of the volume flow of the cooling air through the grate cooler can also be achieved with a round regulator housing, for example, which has a conical cross-sectional narrowing extending in the flow direction, the inner body against which the cooling air flow flows from below being arranged in the region of the housing cone, so that axial displacement of the inner body brought about by the cooling air flow causes the free flow cross section between the inner body edge and the housing cone to change and, associated therewith, automatic regulation of the cooling air volume flow.

BRIEF DESCRIPTION OF THE DRAWINGS

The invention and further features and advantages thereof are explained in greater detail with reference to the illustrative embodiments shown diagrammatically in the figures, in which.

DETAILED DESCRIPTION OF THE DRAWINGS

Figure 1:
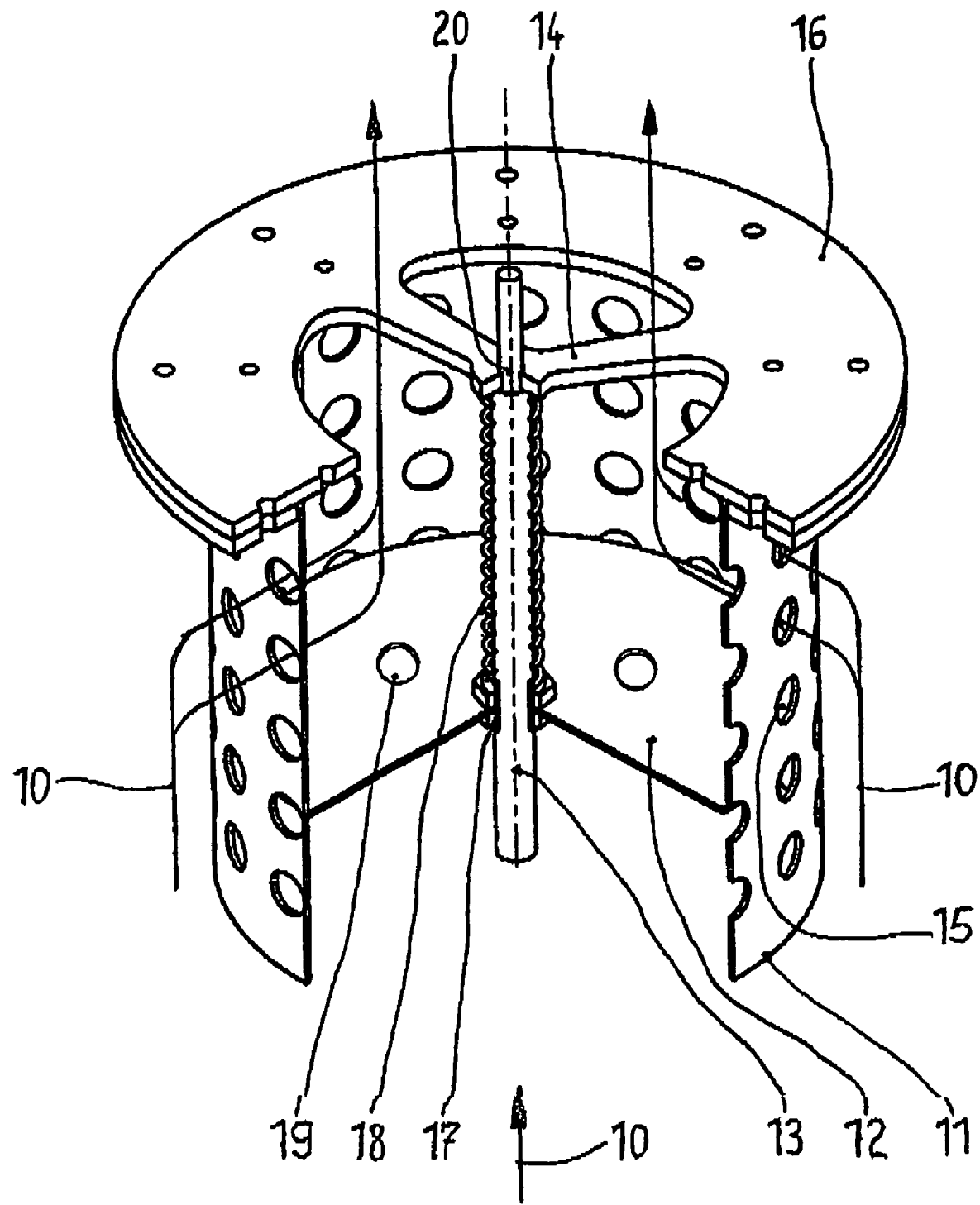
FIG. 1 shows a perspective view of a first illustrative embodiment of the cooling air regulating device according to the invention, where a front portion of the regulator housing has been cut out for the purpose of seeing into the interior.
Figure 3:
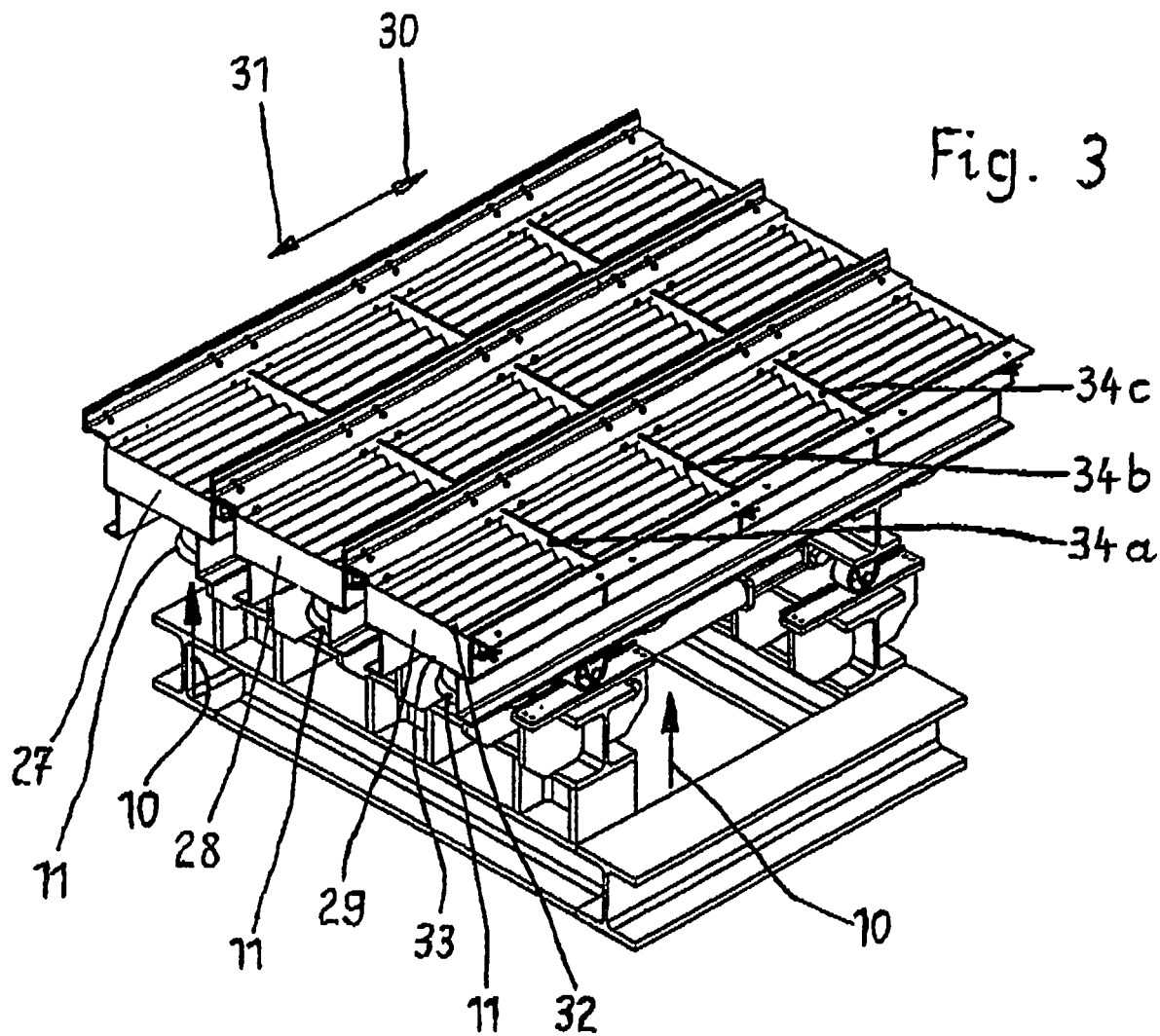

The automatically operating regulating device according to the invention in FIG. 1 flowed through by the cooling air 10 of a grate cooler for cooling hot bulk material such as cement clinker, for example, a large number of such regulating devices being attached to the lower side of the cooling grate illustrated in part in FIG. 3, has a regulator housing 11 and an inner body 12 arranged therein. Housing 11 and inner body 12 are of round design; however, they can also have a polygonal configuration. The disk-shaped inner body 12 is guided automatically translatorily movably in the main flow direction of the cooling air 10 on a central spindle 13, for example, which is supported in the housing 11 at least on the upper side by struts 14, a change in the pressure loss in the cooling air flow above the inner body, or a change in the pressure difference between lower side and upper side of the inner body 12, bringing about axial displacement of the inner body 12.

The regulator housing 11 in FIG. 1 has, for example, a large number of openings 15 distributed over the length or height and around the periphery of the housing, cooling air 10 flowing into the interior of the housing 11 through these openings 15 and flowing out into the cooling grate on the upper side 16 of the housing, which is flanged onto the lower side of the cooling grate, via corresponding outlet openings in the upper side 16. When the pressure loss of the cooling air begins to fall, for example at the time of an incipient air breakthrough in a grate cooler region with a small bulk material bed height, the inner body 12 is pushed upward automatically by the cooling air flow, and the number of openings 15 in the housing 11 which are flowed through by cooling air is reduced, which makes it possible for the cooling air quantity to be throttled or kept essentially constant automatically. The center of the inner body 12 has a bush 17 with which the inner body is guided along the spindle 13 of the regulator housing. At least one restoring spring 18, which is arranged around the spindle 13 as a helical spring and is supported by the spindle, acts on the center of the inner body 12 in the region of its bush 17.

The inner body 12 can advantageously likewise have cutouts such as holes 19 if only because a minimum cooling air flow is thus also maintained if the inner body 12 should reach its highest position with the maximum throttling effect on the cooling air flow. This ensures that, even if the bulk material bed height should be reduced to zero, the cooling grate is always cooled. The preloading force of the at least one restoring spring 18 is settable and variable by virtue of the spring end facing away from the inner body 12 being supported on a control element 20 which is threaded, for example, and by means of which the spring preloading force can be adjusted. In this way, the regulating characteristic of the regulating device according to the invention can be settable and variable.

If the inner body 12 is also mounted rotatably at its bush 17 on the regulator housing spindle 13, and if the inner body 12 is designed as a vane wheel which is driven by the cooling air flow 10, the inner body 12 can also rotate in addition to its axial displaceability, which makes it possible to improve the response characteristic of the control element further.

Figure 2:
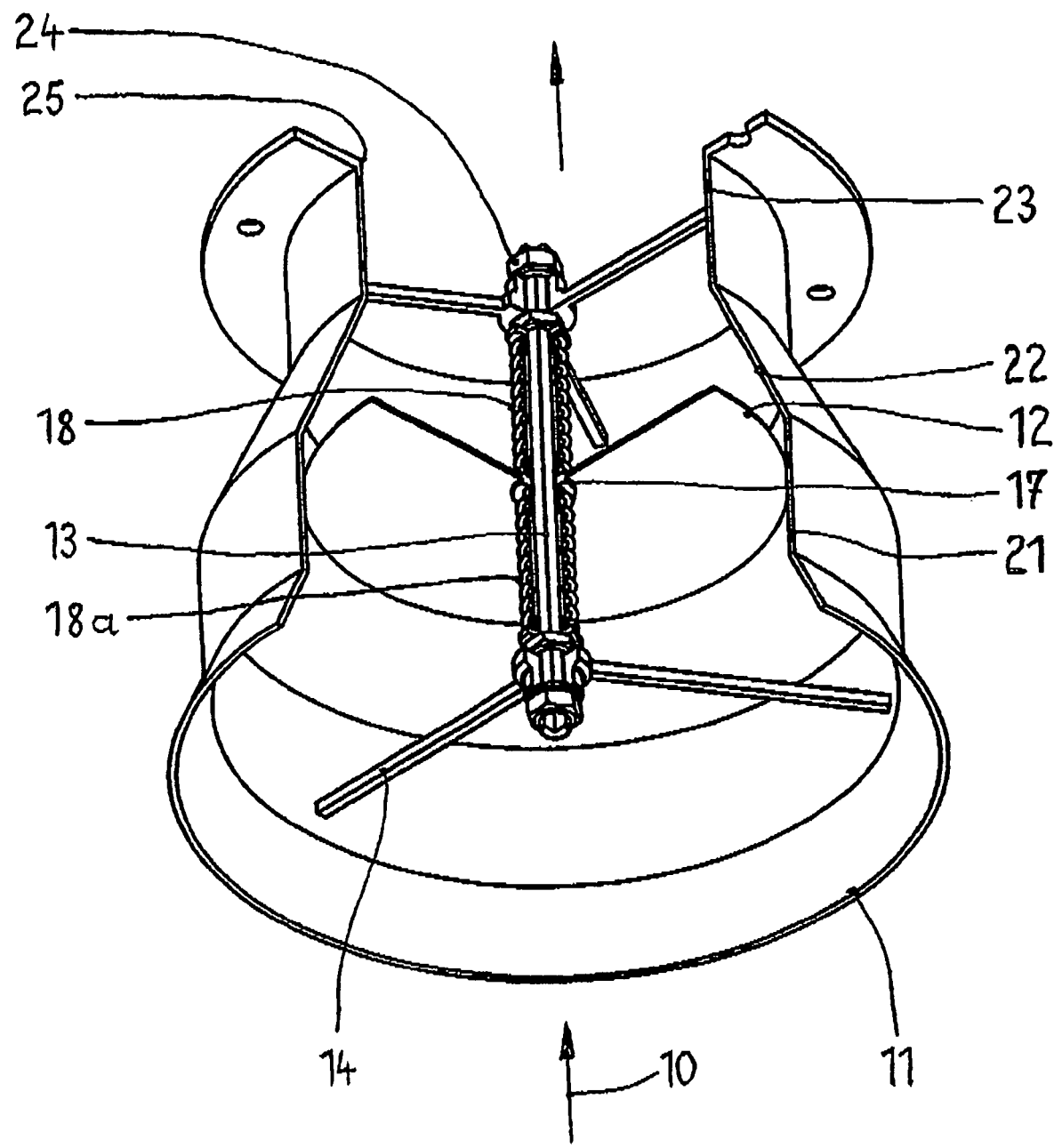
FIG. 2 likewise shows a perspective view of a second illustrative embodiment of the cooling air regulating device according to the invention, where a front portion of the regulator housing has again been cut out for the purpose of seeing into the interior, and FIG. 3 likewise shows a perspective view of a cooling grate module of a bulk material cooler with cooling air regulating devices from the figures mentioned above attached to the lower side of the cooling grate, the cooling grate of a bulk material cooler being made up of a large number of such modules arranged one behind another and one next to another.

According to the further illustrative embodiment in FIG. 2, the regulator housing 11 has three regions which follow one another and meet one another in the cooling air flow direction, namely a cross-sectionally cylindrical inflow region 21 and, following this, a cone region 22 tapering frustoconically in the flow direction, the conically reduced cross section of which is followed by a cylindrical outflow region 23. The inner body 12 is again guided on a central spindle 13, which in this case is supported in the housing 11 at the bottom and at the top by struts 14, and it can again be moved automatically in the flow direction of the cooling air 10, axial displacement of the inner body 12 causing the free flow cross section between the inner body edge and the housing cone 22 to change in such a way that an increase in the flow rate in the region of the inner body 12, for example at the time of an incipient air breakthrough in a grate cooler region with a small bulk material bed height, automatically brings about a reduction in the free flow cross section and thus throttling of the cooling air flow quantity, and vice versa. The regulating device in FIG. 2 can also be designed in such a way that it essentially makes constant regulation of the volume flow of the cooling air 10 possible.

According to FIG. 2, the center of the inner body 12 again has a bush 17 with which the inner body 12 is guided along the spindle 13 of the regulator housing. At least one restoring spring 18, which is arranged around the spindle 13 as a helical spring and is supported by the spindle and which keeps the annular gap between inner body 12 and regulator housing cone open in the absence of the cooling air flow 10, acts on the center of the inner body 12 in the region of its bush 17.

In the illustrative embodiment in FIG. 2 as well, the preloading force of the at least one restoring spring 18 is settable and variable by virtue of the spring end facing away from the inner body 12 being supported on an adjusting nut 24, for example, which is screwed adjustably onto the threaded end of the spindle 13 for the purpose of setting/changing the spring preloading force. Instead of or in addition to the compression spring 18, a tension spring 18a, which interacts with the other end of the spindle 13, can also be present. Here too, the regulating characteristic of the regulating device according to the invention is set and if appropriate varied according to the cooler operation situation by changing the spring preloading force.

In a similar way to the illustrative embodiment in FIG. 1, the inner body 12 can also be mounted rotatably in the case of the regulating device in FIG. 2, and the inner body 12 can also be provided with cooling air passage holes.

It can be seen from FIG. 3 that a large number of the cooling air regulating devices from FIG. 1 and/or alternatively FIG. 2 can with in each case their upper outlet openings 25 for the cooling air flow 10 be flanged onto the cooling air inlet openings in the lower side of an in particular moving cooling grate for supplying it with cooling air. Explained with reference to the cooling grate module in FIG. 3, each module according to the illustrative embodiment consists of three elongate, approximately trough-shaped bottom elements 27, 28, 29 which extend in the longitudinal direction of the cooler, are arranged next to one another and can be moved independently of one another in a controlled manner between a forward stroke position 30 in the transport direction of the material being cooled and a return stroke position 31, so that the hot material being cooled (not illustrated) located on the bottom elements is conveyed gradually through the cooler, according to the walking floor conveying principle, for example. The drive of the individual bottom elements 27, 28, 29 of the cooling grate modules is effected from below the cooling grate via push frames which are supported on rollers and acted on by working cylinders and in particular controlled in such a way that the bottom elements are moved forward together but are not moved backward together but separately in time.

The bottom elements 27, 28, 29 of all the modules are designed as hollow bodies, that is they have, seen in cross section, an upper side 32, which carries the material being cooled and is permeable essentially from the bottom to the top for the cooling air 10, and a closed lower side 33, which is spaced from the upper side and prevents material being cooled falling through the grate. In this connection, the lower sides 33 of all the bottom elements have a number of cooling air inlet openings which are distributed over the length and onto which the cooling air regulating devices illustrated in FIG. 1 or FIG. 2 are flanged from below, of which the three regulator housings 11 of the three cooling grate bottom elements 27, 28, 29 which can be moved independently of one another can be seen in FIG. 3. The cooling grate upper sides 32 carrying the hot material being cooled such as cement clinker can in principle be provided with any openings which are permeable for the cooling air 10. The cooling grate upper sides 32 can particularly advantageously in each case comprise saddle-roof-shaped V profiles which are arranged opposite one another in a mirror-inverted manner with a spacing but offset in relation to one another and the V legs of which mesh with one another with an interspace, the latter forming a labyrinth for the material being cooled and also for the cooling air 10. This ensures in particular that the bulk material cooler is protected against grate fallthrough.

It can also be seen in FIG. 3 that webs 34a to 34c lying transversely to the transport direction of the material being cooled can be arranged on the upper side 32 permeable for the cooling air 10 of all the bottom elements 27 to 29 for retaining the bottom bulk material layer and avoiding relative movement of this bottom layer and the grate bottom element concerned, which contributes to protecting these grate bottom elements against wear.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A device for regulating a flow cross section in cooling air inflows of a bulk material grate cooler for cooling hot bulk material having cooling grates for supporting the bulk material, comprising:
   a regulator housing integrated into the cooling air inflow below the cooling grate having at least one inlet, at least one outlet and an interior passage between the inlet and outlet for cooling air flow,
   a control element comprising an inner body which can be moved translatorily in the passage by the cooling air flow between an at rest position and a fully displaced position,
   a device arranged to provide a restoring force against the inner body counter to a direction of the cooling air flow,
   the inner body being guided displaceably counter to the action of the restoring force,
   the regulator housing being configured such that with increasing displacement inside the regulator housing of the inner body towards the fully displaced position in response to the cooling air flow, a free flow cross section of the regulator housing remaining for the cooling air is reduced, and with decreased displacement of the inner body away from the at rest position, the free flow cross section of the regulator housing for the cooling air is increased.

2. The regulating device as claimed in claim 1, wherein the regulator housing inlet comprises at least one opening distributed over at least one of a length, height and around a periphery of the regulator housing, the cooling air flowing into the interior passage of the regulator housing through this opening and flowing out through the outlet into the cooling grate on an upper side of the housing, the displacement of the inner body varying a flow cross section of the opening through which cooling air flows.

3. The regulating device as claimed in claim 2, wherein the at least one cooling air inlet opening of the regulator housing has one of a round and polygonally curved contour.

4. The regulating device as claimed in claim 1, wherein the housing includes a flange which is attached onto a lower side of the cooling grate.

5. The regulating device as claimed in claim 1, wherein the regulator housing has a conical cross-sectional narrowing extending in the cooling air flow direction and the inner body is arranged in the region of the housing conical cross-sectional narrowing, axial displacement of the inner body causing a free flow cross section between a peripheral edge of the inner body and the housing conical cross-sectional narrowing to change.

6. The regulating device as claimed in claim 1, wherein a cross section of the regulator housing and a periphery of the inner body are both one of round and polygonal.

7. The regulating device as claimed in claim 1, wherein the restoring force device comprises a restoring spring and the restoring force provided by the restoring spring is settable and variable by means of changing the preloading force of the restoring spring.

8. The regulating device as claim in claim 7, wherein the regulator housing further comprises a spindle to guide the inner body as it moves between the at rest position and the fully displaced position, and the restoring spring is a helical spring which is arranged around the spindle, the helical spring having an end facing away from the inner body which is supported on a control element, the control element being adjustably threaded onto a threaded end of the spindle to provide for the setting and changing of the spring preloading force.

9. The regulating device as claimed in claim 1, wherein the regulator housing further comprises a spindle to guide the inner body as it moves between the at rest position and the fully displaced position.

10. The regulating device as claimed in claim 9, wherein the inner body is mounted rotatably at a bush on the regulator housing spindle and is configured as a vane wheel in order to bring about rotation of the inner body as driven by the cooling air flow through the regulator housing.

11. The regulating device as claimed in claim 1, wherein a surface of the inner body acted on by the cooling air flow has at least one cutout to permit a minimum cooling air flow through the housing to be maintained when the inner body reaches the fully displaced position.

12. The regulating device as claimed in claim 1, wherein the cooling grate has both stationary and moving zones and the cooling air quantity regulating devices arranged below the cooling grate of a bulk material cooler are arranged both zones of the cooling grate.

13. A device for regulating a flow cross section in cooling air inflows of a bulk material grate cooler for cooling hot bulk material having cooling grates for supporting the bulk material, comprising:
   a regulator housing having at least one inlet, at least one outlet and an interior passage between the inlet and outlet for a cooling air flow,
   an inner body positioned in the passage and movable along a guide between an at rest position and fully displaced position by the cooling air flow,
   a device arranged to provide a restoring force against the inner body counter to a direction of the cooling air flow,
   the regulator housing being configured such that with increasing displacement of the inner body towards the fully displaced position in response to the cooling air flow, a free flow cross section of the regulator housing for the cooling air is reduced, and with decreased displacement of the inner body away from the at rest position, the free flow cross section of the regulator housing for the cooling air is increased.

14. A device for regulating a flow cross section in cooling air inflows of a bulk material grate cooler for cooling hot bulk material having cooling grates for supporting the bulk material, comprising:
   a regulator housing having at least one inlet at least one outlet and an interior passage between the inlet and outlet for a cooling air flow,
   an inner body positioned in the passage and movable along a guide between an at rest position and fully displaced position by the cooling air flow,
   a device arranged to provide a restoring force against the inner body counter to a direction of the cooling air flow,
   the regulator housing being configured such that with increasing displacement of the inner body towards the fully displaced position in response to the cooling air flow, a free flow cross section of the regulator housing for the cooling air is reduced, and with decreased displacement of the inner body away from the at rest position, the free flow cross section of the regulator housing for the cooling air is increased, wherein the regulator housing inlet comprises at least one opening distributed over at least one of a length, height and around a periphery of the regulator housing, the cooling air flowing into the interior passage of the regulator housing through this opening and flowing out through the outlet into the cooling grate on an upper side of the housing, the displacement of the inner body varying a flow cross section of the opening through which cooling air flows.

15. A device for regulating a flow cross section in cooling air inflows of a bulk material grate cooler for cooling hot bulk material having cooling grates for supporting the bulk material, comprising:
a regulator housing having at least one inlet, at least one outlet and an interior passage between the inlet and outlet for a cooling air flow,
an inner body positioned in the passage and movable along a guide between an at rest position and fully displaced position by the cooling air flow,
a device arranged to provide a restoring force against the inner body counter to a direction of the cooling air flow,
the regulator housing being configured such that with increasing displacement of the inner body towards the fully displaced position in response to the cooling air flow, a free flow cross section of the regulator housing for the cooling air is reduced, and with decreased displacement of the inner body away from the at rest position, the free flow cross section of the regulator housing for the cooling air is increased, wherein the regulator housing has a conical cross-sectional narrowing extending in the cooling air flow direction, and the inner body is arranged in the region of the housing conical cross-sectional narrowing, axial displacement of the inner body causing a free flow cross section between a peripheral edge of the inner body and the housing conical cross-sectional narrowing to change.

16. The regulating device as claimed in claim 13, wherein the restoring force device comprises a restoring spring and the restoring force provided by the restoring spring is settable and variable by means of changing the preloading force of the restoring spring.

17. The regulating device as claimed in claim 16, wherein the regulator housing further comprises a spindle to guide the inner body as it moves between the at rest position and the fully displaced position, and the restoring spring is a helical spring which arranged around the spindle, the helical spring having an end facing away from the inner body which is supported on a control element, the control element being adjustably threaded onto a threaded end of the spindle to provide for the setting and changing of the spring preloading force.

18. The regulating device as claimed in claim 13, wherein the regulator housing further comprises a spindle to guide the inner body as it moves between the at rest position and the fully displaced position.

19. A device for regulating a flow cross section in cooling air inflows of a bulk material grate cooler for cooling hot bulk material having cooling grates for supporting the bulk material, comprising:
a regulator housing having at least one inlet, at least one outlet and an interior passage between the inlet and outlet for a cooling air flow,
an inner body positioned in the passage and movable along a guide between an at rest position and fully displaced position by the cooling air flow,
a device arranged to provide a restoring force against the inner body counter to a direction of the cooling air flow,
the regulator housing being configured such that with increasing displacement of the inner body towards the fully displaced position in response to the cooling air flow, a free flow cross section of the regulator housing for the cooling air is reduced, and with decreased displacement of the inner body away from the at rest position, the free flow cross section of the regulator housing for the cooling air is increased, wherein a surface of the inner body acted on by the cooling air flow has at least one cutout to permit a minimum cooling air flow through the housing to be maintained when the inner body reaches the fully displaced position.

* * * * *